United States Patent
Iwami et al.

(10) Patent No.: US 7,426,824 B2
(45) Date of Patent: Sep. 23, 2008

(54) CABLE PROTECTION GUIDE HAVING IMPROVED SKATE

(75) Inventors: Tsutomu Iwami, Osaka (JP); Fujio Yamamoto, Saitama (JP)

(73) Assignees: Tsubakimoto Chain Co., Osaka (JP); Nissan Tanaka Corpration, Saitama (JP)

( * ) Notice: Subject to any disclaimer, the term of this patent is extended or adjusted under 35 U.S.C. 154(b) by 324 days.

(21) Appl. No.: 11/472,649

(22) Filed: Jun. 22, 2006

(65) Prior Publication Data

US 2007/0022730 A1    Feb. 1, 2007

(30) Foreign Application Priority Data

Jul. 8, 2005    (JP) .............................. 2005-200236

(51) Int. Cl.
*F16G 13/16*    (2006.01)
(52) U.S. Cl. .............................. 59/78.1; 248/49; 248/51; 191/12 C
(58) Field of Classification Search ................ 59/78.1; 248/49, 51; 191/12 C
See application file for complete search history.

(56) References Cited

U.S. PATENT DOCUMENTS

| | | | | |
|---|---|---|---|---|
| 5,649,415 A | * | 7/1997 | Pea ............................. | 59/78.1 |
| 7,310,935 B2 | * | 12/2007 | Worms ....................... | 59/78.1 |
| 7,343,731 B2 | * | 3/2008 | Iwami et al. .................. | 59/78.1 |
| 7,373,770 B2 | * | 5/2008 | Iwami et al. .................. | 59/78.1 |
| 2005/0155337 A1 | | 7/2005 | Worms | |
| 2007/0277499 A1 | * | 12/2007 | Iwami et al. .................. | 59/78.1 |

FOREIGN PATENT DOCUMENTS

| | | | |
|---|---|---|---|
| EP | 1 193 420 | * | 4/2002 |
| JP | 5716273 | * | 4/1962 |
| JP | 10-220533 | * | 8/1998 |
| WO | WO 03/060346 | | 7/2003 |

OTHER PUBLICATIONS

U.S. Appl. No. 11/414,813, Tsutomu Iwami.

* cited by examiner

*Primary Examiner*—David B Jones
(74) *Attorney, Agent, or Firm*—Howson & Howson LLP (57) ABSTRACT

A skate for interposition between opposed parts of a folded protective cable guide is composed of skate units which are articulably connected to one another through connecting blocks, using pins or stepped bolts.

18 Claims, 7 Drawing Sheets

CABLE PROTECTION GUIDE HAVING IMPROVED SKATE

CROSS-REFERENCE TO RELATED APPLICATION

This application claims priority on the basis of Japanese patent application 2005-200236, filed Jul. 8, 2005. The disclosure of Japanese application 2005-200236 is hereby incorporated by reference.

FIELD OF THE INVENTION

This invention relates generally to cable guides for protecting and guiding flexible cables. More specifically, the invention relates to an improved skate for interposition between two facing parts of a folded cable guide in order to promote smooth flexing movement of the cable guide, and to prevent damage resulting from frictional contact between the parts and thereby extending the useful life of the cable guide.

BACKGROUND OF THE INVENTION

The term "flexible cable," as used herein, means any flexible, elongated, energy or fluid-conducting device, such as a cable composed of one or more electrical wires or optical fibers, a fluid-conducting hose for conducting compressed air or a hydraulic fluid used as a medium for transmission of motive power, a flexible conduit used to convey a gas, a liquid, or another fluid material for use in a machine or industrial process, a flexible actuator such as a Bowden wire, or a flexible rotating shaft with or without anon-rotating sheath. Such flexible cables are used, for example, to connect relatively moving parts of a machine such as a machine tool, an industrial robot, or a conveyor or other material-handling or material-carrying machine, such as a hoist or other machine used in a civil engineering application.

When a flexible cable is connected to a moving part, torsion, flexion, and tensile forces applied to the cable as a result of movement of the moving part can result in damage to, or distortion of, the cable. Cable guides have been used to avoid damage and distortion of the cables.

Figure 7:
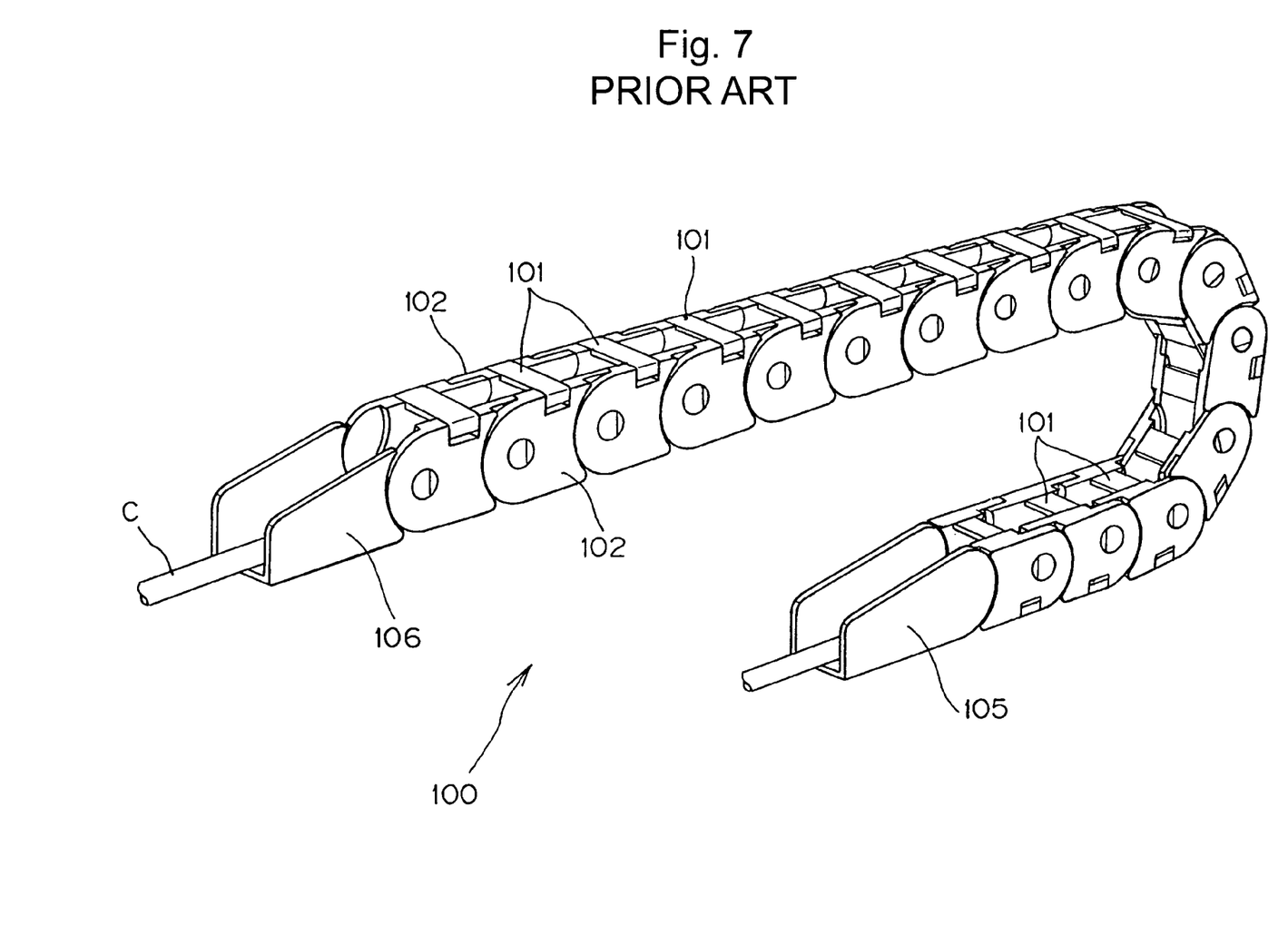
FIG. 7 is a perspective view showing a typical cable protection guide.

As shown in FIG. 7, a typical cable guide 100 is composed of a number of links, each comprising a pair of side plates 102 disposed on both sides of a cable C and connecting plates 101 connecting the side plates. As shown in FIG. 7, the connecting plates 101 are provided both above and below the cable, and together with the side plates 102, form an elongated channel through which the cable C extends. The side plates 102 on each side of the guide are hinged to one another so that the guide can bend at least in a single plane. Usually, the flexion of the guide is limited to a specific minimum radius of curvature in order to avoid kinking of the cable C.

Figure 5:
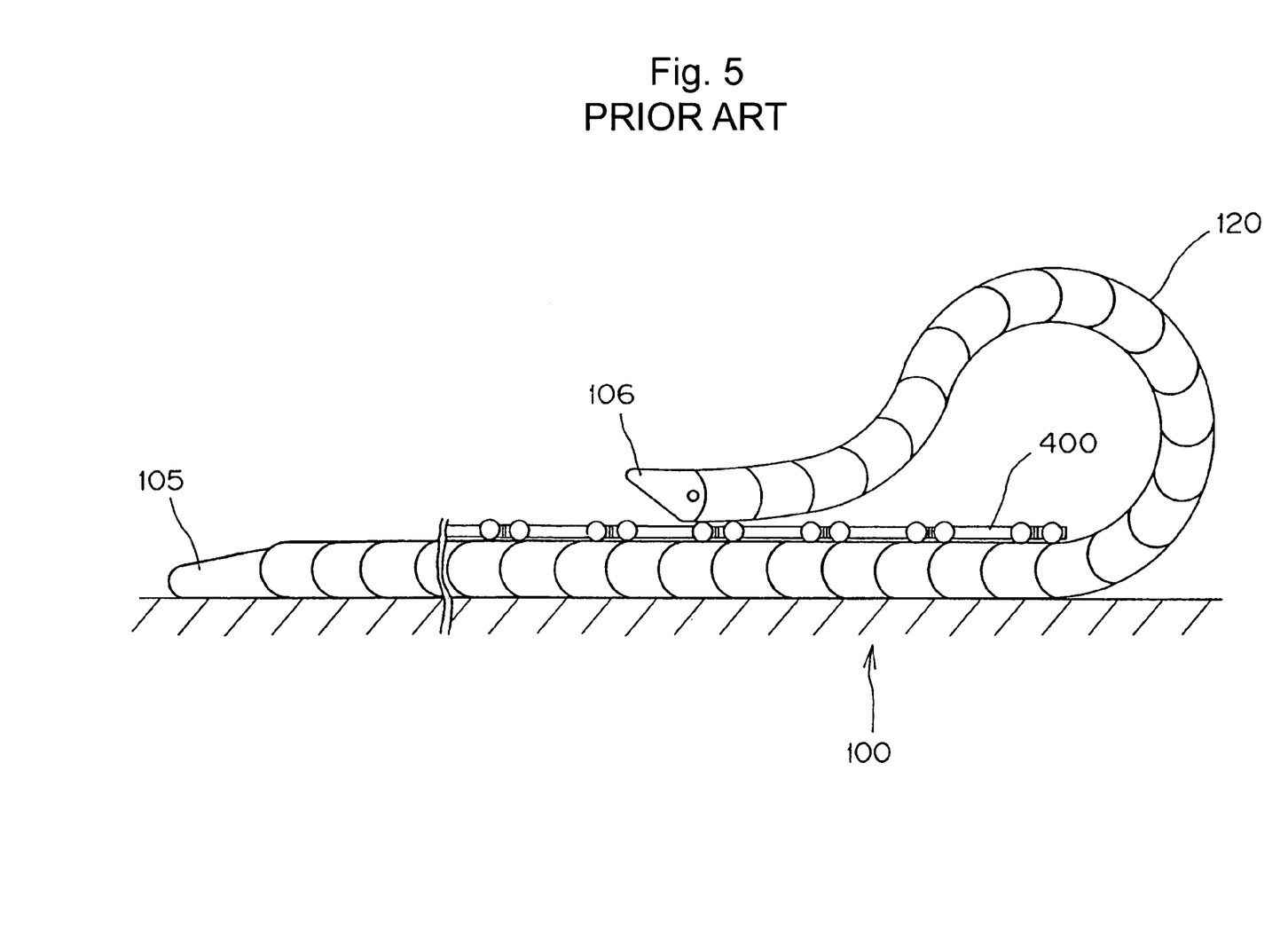
FIG. 5 is an elevational view showing a conventional skate unit for a cable protection guide.

Typically, the cable guide has a fixed end 105 and a moving end 106. Where a cable guide of sufficient length is folded on itself by a bend 120 as shown in FIG. 5, it is possible for two portions of the guide to come into face-to-face contact with each other. Friction between the contacting parts of the guide can obstruct smooth reciprocating motion. Moreover, frictional contact over time can cause wear and eventual breakage of the cable guide. Breakage can also result from interference between projecting portions of the two facing parts of the guide.

To avoid the problems resulting from frictional contact between facing parts of a folded cable guide, a skate can be interposed between the facing parts. As illustrated in FIG. 5, a skate 400 is sandwiched between two facing parts of the cable guide, preventing direct contact between the facing parts.

A typical conventional skate is depicted and described in United States Patent Application Publication 2005/0155337, dated Jul. 21, 2005.

Figure 6:
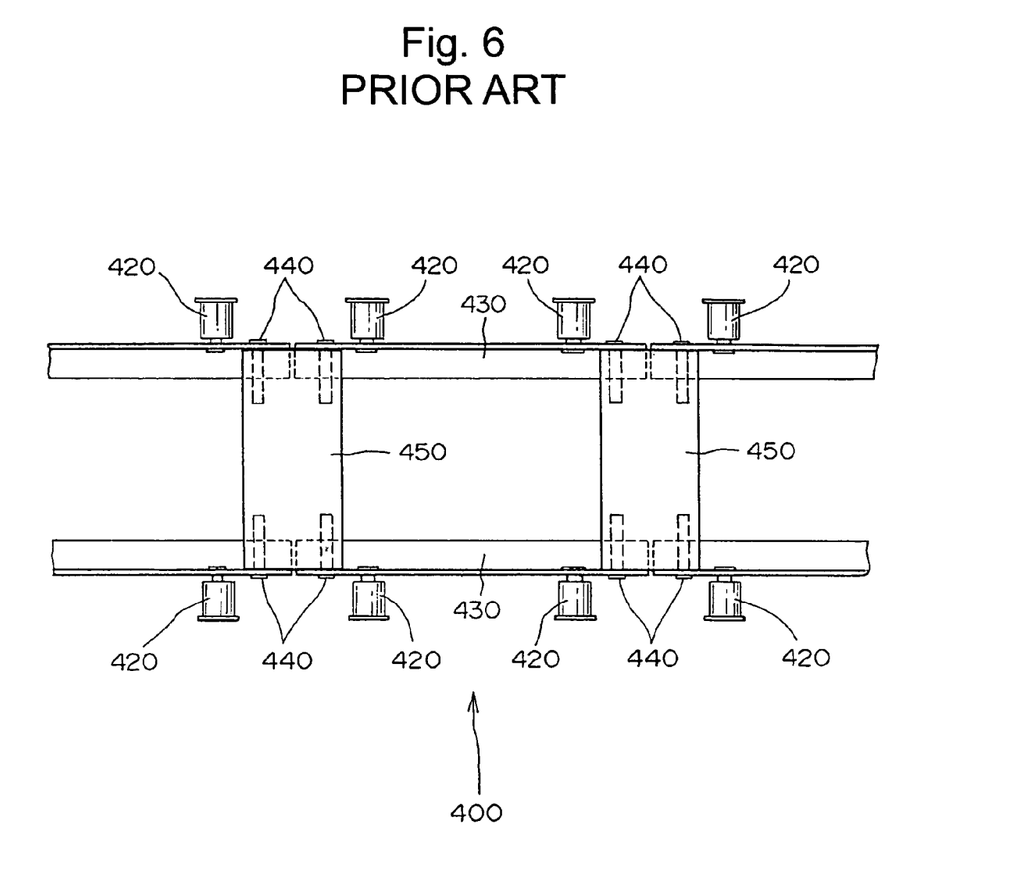
FIG. 6 is a plan view of a conventional skate unit.

As shown in FIG. 6, the conventional skate 400 includes a series of interconnected skate units in aligned, sequential relationship, each having a pair of side frames 430. Each side frame has an L-shaped cross-section, and is provided with pair of rollers 420 mounted on a vertical part of the frame. The rollers are positioned so that they can be sandwiched between the facing parts of the guide. The skate units are connected by connecting blocks 450, which maintain the side frames 430 at a fixed distance from each other. Adjacent units are fixed to the connecting blocks by bolts 440, which are threaded into screw holes in the connecting block 450.

The skate 400 is formed by connecting a suitable number of skate units to one another to provide a skate having a length corresponding to the maximum overlap of the two mutually facing parts of the guide. Because the skate units are fixed to the connecting blocks by bolts, and also because flanges of the side frames 430 underlie the connecting blocks, the entire skate is substantially inflexible. The conventional skate can be used satisfactorily if a sufficient portion of the cable guide adjacent the fixed end is always straight. However, if some bending occurs in the portion of the guide adjacent the fixed end, the skate may need to be shortened in order to avoid the generation of excessive forces that could result in deformation or breakage of the guide, or in impairment of the smooth operation of the guide.

SUMMARY OF THE INVENTION

The skate used in the guided cable structure according to this invention is composed of interconnected units that can be articulated freely relative to each other at least in the plane in which the cable guide is situated. The articulation of the skate units allows a full length skate to be used even when both of the facing parts of the cable guide bend during use.

More particularly, a guided cable structure in accordance with the invention comprises a flexible cable, an elongated guide folded on itself so that two adjacent parts face each other, and a novel friction-reducing skate sandwiched between the facing parts.

The guide is composed of a plurality of articulably interconnected links forming an elongated channel through which the flexible cable extends. The portions of the longitudinal centerline of the guide within the facing parts are substantially parallel to each other and lie substantially in a central plane. The facing parts are relatively movable along a direction parallel to the parallel portions of the centerline. The friction-reducing skate is sandwiched between the facing parts, and prevents direct contact between the facing parts. The skate comprises a plurality of interconnected units disposed adjacent one another along a direction parallel to the parallel portions of the centerline direction, and the units of each adjacent pair of interconnected units are connected to each other in freely articulable relationship at least in the central plane.

Preferably, each unit of each adjacent pair of articulably interconnected units includes a first pair of rollers on one side of the central plane, and a second pair of rollers on the opposite side of the plane, and the adjacent facing parts of the guide are in contact with the rollers. Preferably, each unit of each adjacent pair of units comprises a pair of parallel rails, the first pair of rollers being mounted on one of the rails and a second pair of rollers being mounted on the other rail.

In accordance with one aspect of the invention, the units of each adjacent pair of units are connected to each other by a connecting block, and articulable relative to the connecting block. Each unit of each adjacent pair of units may be articulably connected to the connecting block by a pin, extending through the connecting block in a direction perpendicular to the central plane.

Where each skate unit comprises a pair of parallel rails, both rails can be articulably connected to the connecting block by a single pin extending through the connecting block in a direction perpendicular to the central plane. In accordance with another aspect of the invention, each of the parallel rails can be journalled on a cylindrical portion of a bolt threaded into the connecting block, and thereby articulably connected to the connecting block.

In accordance with still another aspect of the invention, each unit, which may comprise a pair of parallel rails, is articulably connected to the connecting block by a pair of pins, each extending into the connecting block in a direction perpendicular to the central plane.

In a preferred embodiment, the units of each adjacent pair are connected to each other by a connecting block having a U-shaped cross-section in section planes transverse to the central plane. Each connecting block has two laterally spaced side walls, and a first pin extends laterally, along a first axis, through both side walls and through one unit of the adjacent pair, and a second pin extends laterally, along a second axis, through both side walls and through the other unit of the adjacent pair. Consequently each skate unit of the adjacent pair is freely articulable, about one of the axes, with respect to the connecting block.

Because the units of the skate according to the invention articulate freely, at least in the plane in which the protective guide bends, a longer skate can be used even in the case where both facing parts of the guide bend during use, without the risk of damage to the guide, and without impairing smooth operation of the guide. The skate unit is structurally simple, and can be produced at low cost.

DETAILED DESCRIPTION OF THE PREFERRED EMBODIMENT

Figure 1:
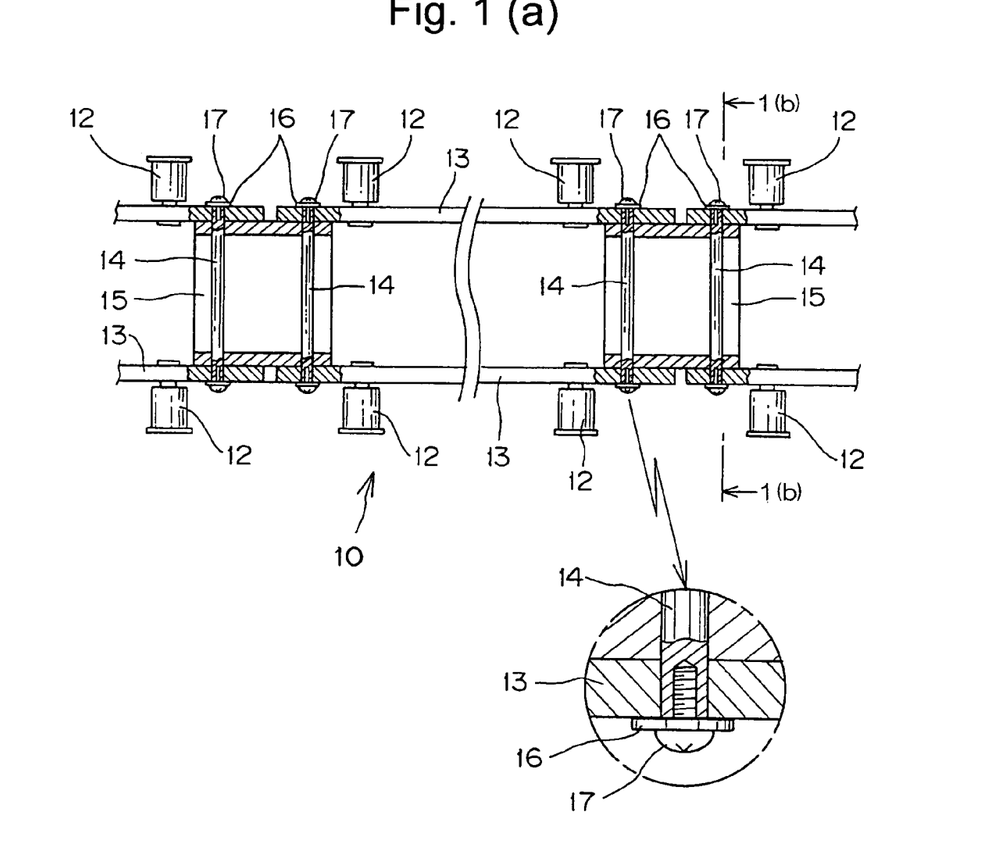
FIG. 1(a) is a plan view, partly in section, showing a skate unit for a cable protection guide in accordance with a first embodiment of the invention, including an enlargement showing details of a connecting pin.
FIG. 1(b) is a section taken on plane 1(b)-1(b) of FIG. 1(a)

The skate 10, shown in FIGS. 1(a) and 1(b), is composed of a series of interconnected skate units in aligned, sequential relationship, each unit comprising a pair of parallel rails 13, each having a pair of rollers 12 which extend laterally outward. The rollers are rotatable on pins fixed to the rails, and the diameters of the cylindrical parts of the rollers are greater than the height of the rails. The rollers are provided with flanges at their outer ends, which keep the skate units aligned with the cable guide.

The skate is sandwiched between opposed portions of a folded cable guide as depicted in FIG. 5. As the cable guide flexes during use, it flexes in a simple curve. That is, an imaginary centerline, extending longitudinally through the center of cable-accommodating channel within the guide, remains substantially in one imaginary plane, defined by the portions of the centerline in which the opposed portions of the cable guide lie.

Connecting blocks 15, maintain a predetermined spacing between the parallel rails 13, and also connect the skate units to one another. Each of the connecting blocks 15 of the skate 10 shown in FIG. 1(a) is a steel plate having a U-shaped cross section, as shown in FIG. 1(b). Connecting pins 14 are inserted through insertion holes provided in the rails 13 and in the connecting blocks 15. The connecting pins are secured to the skate units and connecting blocks by screws 17, which are threaded into the ends of the connecting pins as shown in the enlargement in FIG. 1(a), and washers 16 underneath the heads of the screws 17 engage the outer surfaces of the rails 13. As an alternative to the screws and washers, the connecting pins can be secured to the skate units and blocks by Cotter pins, wire hoops, or other suitable devices.

The length of each of the pins 14 is preferably slightly greater than the sum of the width of the connecting block and the widths of the two opposite rails 13. Moreover, the diameters of the insertion holes in the connecting blocks or in the side rails is slightly greater than the diameters of the pins 14 on both end portions of the connecting pin 14. As a result, the skate units of each pair of adjacent skate units are freely articulable relative to the connecting blocks and relative to each other about the pin axes through washers 16, and are thus freely articulable in the plane defined by the portions of the guide centerline within the opposed portions of the guide.

Figure 2:
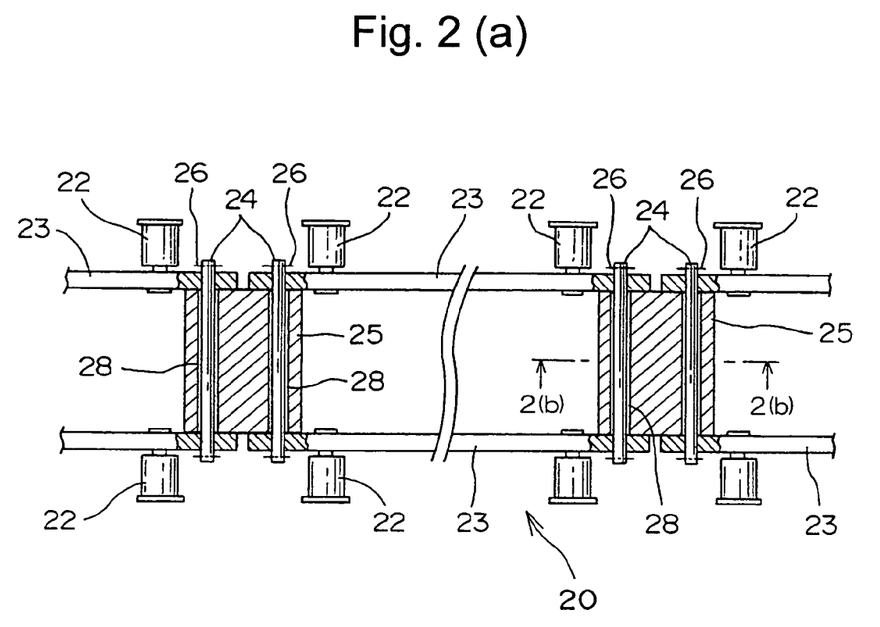
FIG. 2(a) is a plan view, partly in section, showing a skate unit for a cable protection guide in accordance with a second embodiment of the invention.
FIG. 2(b) is a section taken on plane 2(b)-2(b) of FIG. 2(a)

The second embodiment, depicted in FIGS. 2(a) and 2(b), is similar to the embodiment of FIGS. 1(a) and 1(b), and corresponding parts are identified by reference numbers that exceed, by 10, the reference numbers in FIGS. 1(a) and 1(b).

The rails 23, forming the skate units of skate 20, are held at a predetermined spacing by connecting blocks 25. These connecting blocks, unlike the U-shaped blocks of the first embodiment, are rectangular prism-shaped blocks, having elongated insertion holes 28, through which connecting pins 24 extend. The connecting pins 24 are secured in place by Cotter pins 26, and extend through the insertion holes 28 with a clearance, so that the individual skate units can articulate about the pin axes relative to the connecting blocks and relative to one another. In this embodiment, instead of using Cotter pins, the connecting pins 24 can be held in place by wire hoops, or by means of screws and washers as in the first embodiment.

Figure 3:
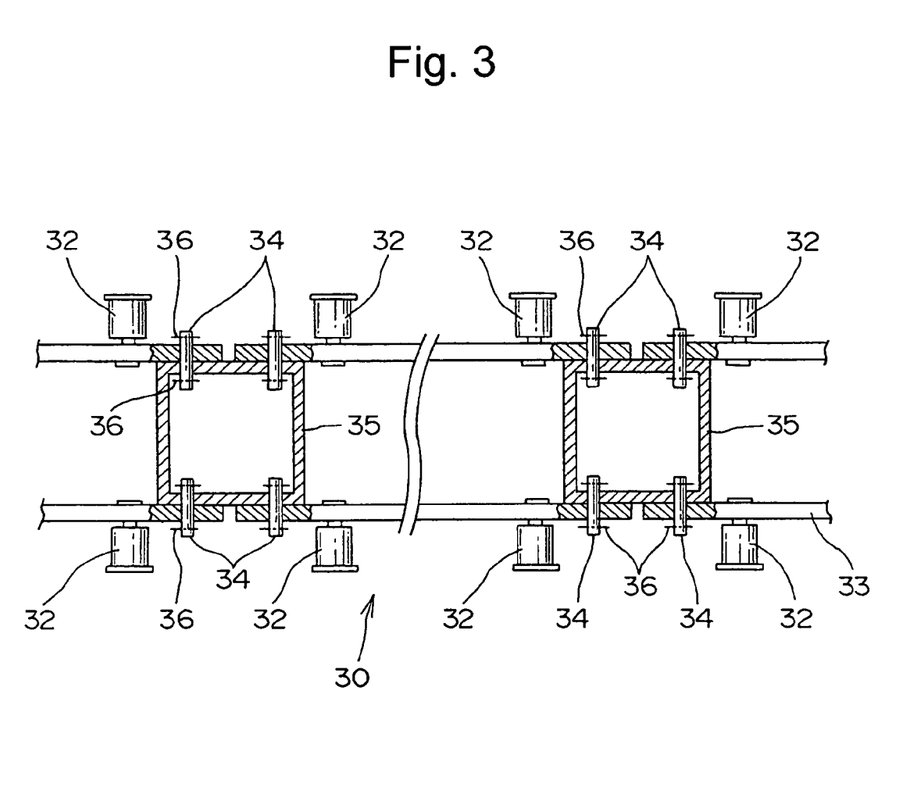
FIG. 3 is a plan view, partly in section, showing a skate unit for a cable protection guide in accordance with a third embodiment of the invention.

In the third embodiment, depicted in FIG. 3, parts corresponding to parts in FIG. 1(a) are identified by reference numbers that exceed, by twenty, the reference numbers in FIG. 1(a).

In FIG. 3 each of the connecting blocks 35 in skate 30 is in the shape of a hollow rectangular frame, having side walls but lacking top and bottom walls. Short connecting pins 34 extend through insertion holes in the rails 33 and insertion holes formed in walls of the connecting block 35. Cotter pins are provided at both ends of each of the short pins 34. The adjacent skate units 30 are freely articulable about the pin axes relative to the connecting blocks and relative to one another. The connecting pins can be held in place by wire hoops, or other suitable securing means, instead of by Cotter pins.

Figure 4:
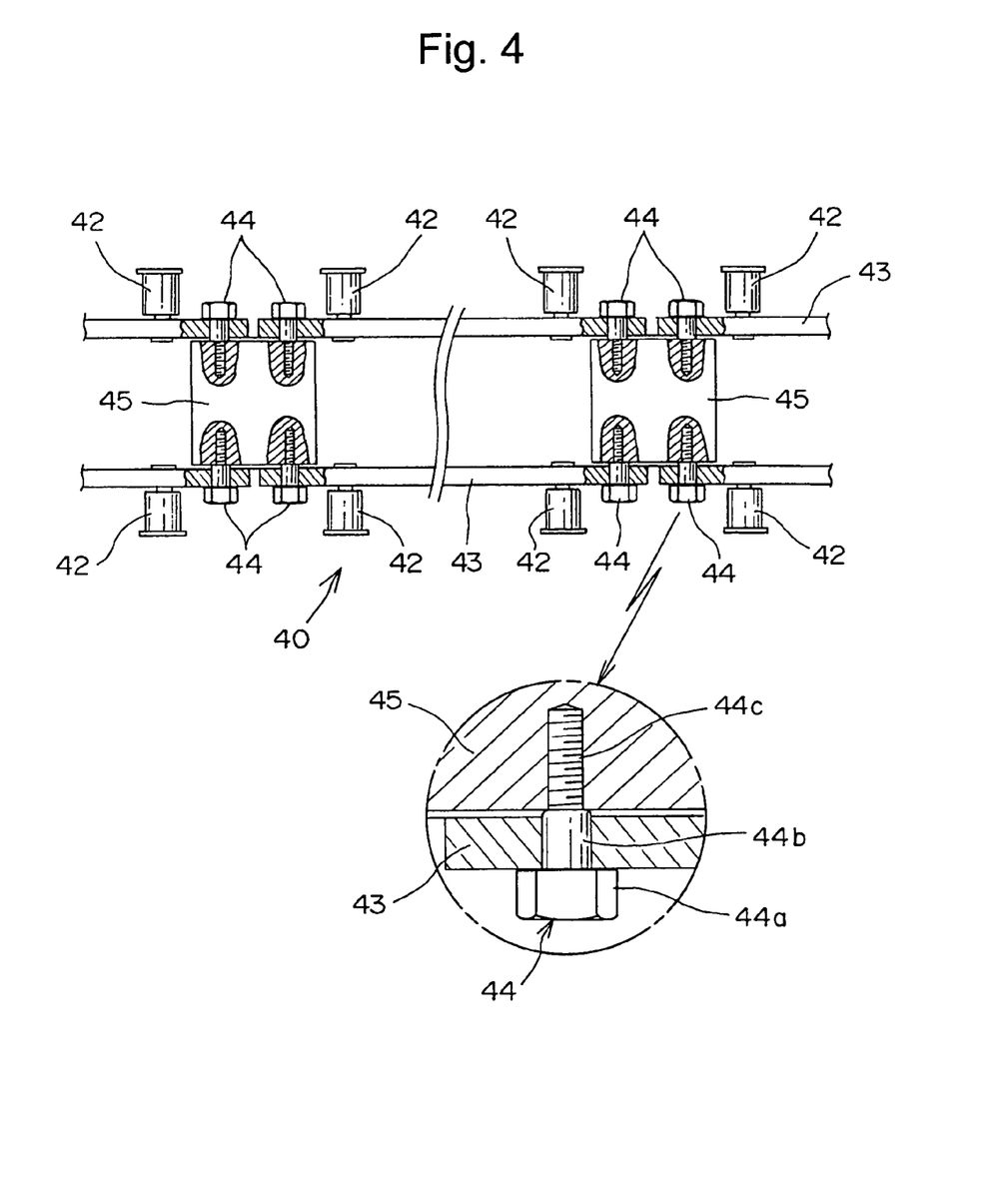
FIG. 4 is a plan view, partly in section, showing a skate unit for a cable protection guide in accordance with a fourth embodiment of the invention, including an enlargement showing details of a connecting bolt.

In the fourth embodiment, depicted in FIG. 4, parts corresponding to parts in FIG. 1(a) are identified by reference numbers that exceed, by thirty, the reference numbers in FIG. 1(a).

The units of skate 40, shown in FIG. 4 are composed of rails 43 having rollers 42. The rails of each skate unit are maintained at a predetermined spacing from each other by rectangular prism-shaped connecting blocks 45, and stepped bolts 44 threaded into screw holes in the connecting block 45. Each stepped bolt 44 comprises a head 44a, a cylindrical portion 44b, and a threaded portion 44c as shown in the enlargement. Insertion holes in the rails 43 are of a size such that they can receive the cylindrical portions 44b of the stepped bolts 44 with a small radial clearance. The length of the cylindrical portion 44b of each bolt is slightly greater than the thickness of the rail though which it extends. Thus, when a rail 43 is bolted to the connecting block 45, the rail is freely pivotable relative to the connecting block at least about the bolt axis so that the skate units are freely articulable relative to the connecting blocks and relative to one another.

In each of the four embodiments, the connecting pins or bolts allow the adjacent skate units to articulate freely at least about the axes of the pins or bolts. Thus, the skate units are free to articulate at least in a plane defined by the portions of a centerline of the guide within the opposed, facing parts of the guide. Because the units articulate freely, even where both facing parts of the guide bend during use, the skate can be made sufficiently long to protect all parts of the guide that might otherwise come into frictional engagement with one another.

What is claimed is:

1. A skate for a guided cable structure in which a cable extends through a flexible protective cable guide, the skate comprising:
    a plurality of skate units disposed in aligned, sequential relationship to one another along a longitudinal direction, each said skate unit comprising a pair of rails in laterally spaced, parallel relationship;
    in which the skate units are freely articulable relative to one another about parallel axes perpendicular to said longitudinal direction.

2. A skate for a guided cable structure in which a cable extends through a flexible protective cable guide, the skate comprising:
    a plurality of skate units disposed in aligned, sequential relationship to one another along a longitudinal direction, each said skate unit comprising a pair of rails in laterally spaced, parallel relationship; and
    a connecting block connecting the adjacent skate units of each adjacent pair of skate units, each connecting block maintaining the pair of rails of each of the skate unit which it connects in said laterally spaced relationship;
    in which the skate units are freely articulable relative to the connecting blocks about parallel axes perpendicular to said longitudinal direction.

3. A skate according to claim 2, in which each said connecting block has a U-shaped cross-section and the adjacent skate units of each adjacent pair are flexibly connected to a connecting block by connecting pins extending through the connecting block.

4. A skate according to claim 2, in which each said connecting block has a U-shaped cross-section and is formed of a pair of opposite, spaced walls and a connecting wall, and the adjacent skate units of each adjacent pair are flexibly connected to a connecting block by connecting pins extending through the spaced walls of the last-mentioned connecting block.

5. A skate according to claim 2, in which each said connecting block is in the shape of rectangular prism and in which the adjacent skate units of each adjacent pair are flexibly connected to a connecting block by connecting pins extending through elongated holes in the last-mentioned connecting block.

6. A skate according to claim 2, in which the adjacent skate units of each adjacent pair are articulably connected to a connecting block by four pins, and in which each of said four pins connects a rail of a skate unit to the last-mentioned connecting block.

7. A skate according to claim 2, in which each connecting block comprises a first pair of opposite walls, and a second pair of opposite walls connected to, and in perpendicular relationship to the walls of the first pair, and in which the adjacent skate units of each adjacent pair are articulably connected to a connecting block by four pins, and in which each of said four pins connects a rail of a skate unit to one of the walls of the first pair of opposite walls of the last-mentioned connecting block.

8. A skate according to claim 2, in which each of the rails of each skate unit is journalled on a cylindrical portion of a bolt threaded into a connecting block, and thereby articulably connected to the last-mentioned connecting block.

9. A guided cable structure comprising:
    a flexible cable;
    an elongated guide composed of a plurality of articulably interconnected links forming an elongated channel through which the flexible cable extends, the channel having a longitudinal centerline, and the guide being folded on itself and having at least two adjacent parts facing each other, the portions of the centerline within said parts being substantially parallel to each other and lying substantially in a plane, and said parts being relatively movable along a direction parallel to said portions of the centerline;
    a friction-reducing skate sandwiched between said facing parts, said skate preventing direct contact between the facing parts;
    wherein the skate comprises a plurality of interconnected units disposed adjacent one another along said direction, the units of each adjacent pair of said interconnected units being connected to each other in freely articulable relationship at least in said plane.

10. A guided cable structure according to claim 9, in which each unit of each adjacent pair of said units includes a first pair of rollers on one side of said plane and a second pair of rollers on the opposite side of said plane, the adjacent facing parts of the guide being in contact with the rollers.

11. A guided cable structure according to claim 9, in which each unit of each adjacent pair of said units comprises a pair of parallel rails, and includes a first pair of rollers mounted on one of the rails and a second pair of rollers mounted on the other of the rails, the adjacent facing parts of the guide being in contact with the rollers.

12. A guided cable structure according to claim 9, in which the units of each adjacent pair of said units are connected to each other by a connecting block having a U-shaped cross-section in section planes transverse to the plane in which said portions of the centerline lie, each connecting block having two laterally spaced side walls, a first pin extending, laterally with respect to said direction parallel to said portions of the centerline, along a first axis through both of said side walls and through one of the units of the adjacent pair, and a second pin extending, laterally with respect to said direction parallel to said portions of the centerline, along a second axis through both of the side walls and through the other of said units of the adjacent pair, whereby each of the skate units of the adjacent pair is freely articulable, about one of said axes, with respect to said connecting block.

13. A guided cable structure according to claim 9, in which the units of each adjacent pair of said units are connected to each other by a connecting block, and articulable relative to the connecting block.

14. A guided cable structure according to claim 13, in which each unit of each adjacent pair of said units is articulably connected to the connecting block by a pin, extending through the connecting block in a direction perpendicular to said plane.

15. A guided cable structure according to claim 13, in which each unit of each adjacent pair of said units comprises a pair of parallel rails, and in which both of the rails are articulably connected to the connecting block by a single pin extending through the connecting block in a direction perpendicular to said plane.

16. A guided cable structure according to claim 13, in which each unit of each adjacent pair of said units comprises a pair of parallel rails, and in which each of the parallel rails is journalled on a cylindrical portion of a bolt threaded into the connecting block, and thereby articulably connected to the connecting block.

17. A guided cable structure according to claim 13, in which each unit of each adjacent pair of said units is articulably connected to the connecting block by a pair of pins, each extending into the connecting block in a direction perpendicular to said plane.

18. A guided cable structure according to claim 13, in which each unit of each adjacent pair of said units comprises a pair of parallel rails, each rail being articulably connected to the connecting block by a pin extending into the connecting block in a direction perpendicular to said plane.

* * * * *